TYER & HELM.
Making Rubber Fabrics.
No. 12,334.
Patented June 30, 1855.
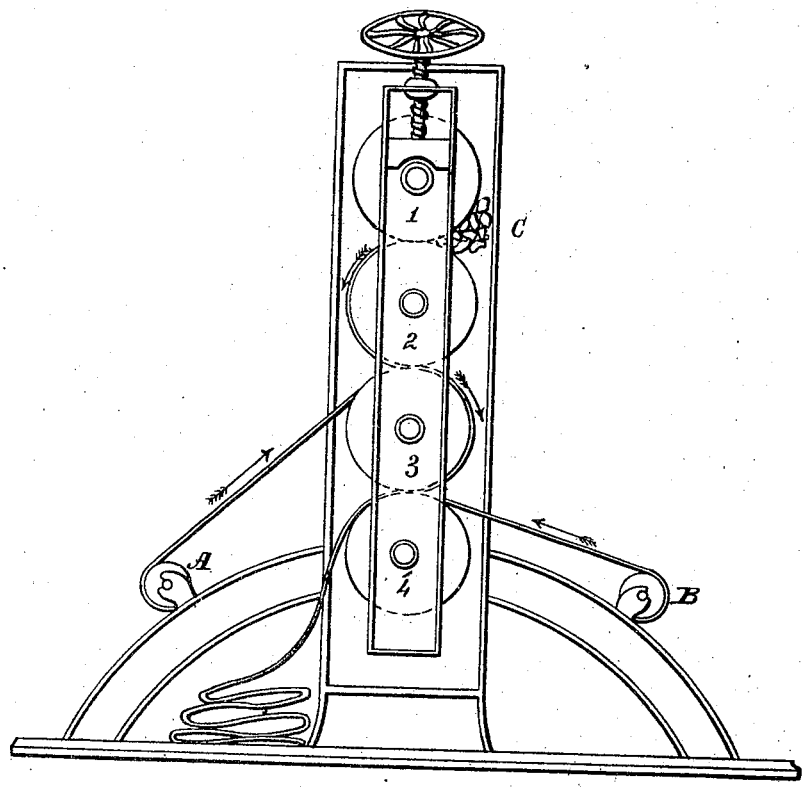

UNITED STATES PATENT OFFICE.

HENRY G. TYER AND JOHN HELM, OF NEW BRUNSWICK, NEW JERSEY.

PROCESS FOR MAKING INDIA-RUBBER CLOTH.

Specification of Letters Patent No. 12,334, dated January 30, 1855.

*To all whom it may concern:*

Be it known that we, HENRY G. TYER and JOHN HELM, both of the city of New Brunswick, in the county of Middlesex and State of New Jersey, have invented a new and useful Improvement in the Process of Manufacturing Elastic Fabrics; and we do hereby declare the following is a full and exact description thereof, reference being had to the accompanying drawing.

The nature of our invention consists in a new mode of applying india rubber compounds to cloth for the purpose of making an elastic article, both with respect to the state or condition of the compound when applied to the cloth, and also with respect to the means and manner of applying it.

The article which we produce consists of a layer of rubber combined with and between two pieces of cloth, and the article, after the cloth is woven and the rubber compound is mixed, we produce by a single operation, thereby combining the rubber composition with the two pieces of cloth by one operation of rolling, as hereinafter described, and without any previous coating of the cloth or spreading of the rubber; and we are not aware that such a process has ever been before employed or known, and we claim that we are the first inventors of that process, and solicit a patent therefor.

We are aware that two pieces of cloth, having been first coated with rubber cement, have been stuck together by passing them between rollers; such has long been practised by us in the manufacture of what are known as the McIntosh goods, but in that case a coat of the rubber cement or composition is first scraped or spread upon each piece of cloth, and after this is done the two cemented sides are put together and caused to adhere by being pressed between rollers, our process avoids the necessity of any previous coating of the cloth and lays the rubber composition between the pieces of cloth, and causes it to adhere and complete the article by a single operation. We are also aware that elastic goods have been made by having the sides of two pieces of cloth cemented, and then having the two cemented sides placed together with threads or strips of rubber or rubber composition between them. Such a process is described in the English patent granted to Caleb Bedels in 1844; also on the shirred goods patent (with the threads stretched) granted to Charles Goodyear, and also in the patent for a process of making elastic goods which was granted to Richard Solis; but neither of those patents contain nor are any of those goods made by, the process for which we seek a patent; on the contrary in making those goods the two pieces of cloth are first prepared by being coated by cement to cause them to adhere to the rubber, and then a sheet or threads of rubber must be formed and prepared, after which they are put together. These detached operations, and slow, tedious and expensive processes are what our process is intended to render unnecessary and to supersede as being more expeditious, better and less expensive and in all respects preferable to any of them. By our process we neither coat the cloth nor prepare any threads or sheets of rubber, nor form any threads or sheets of rubber preparatory for pressing them together, and we avoid all the loss of time and expensive detail connected therewith. We are also aware that it has been a practice in making india rubber goods, and especially in making sheets to be cut up into threads for shirred goods to apply rubber composition to a single piece of cloth by passing the composition and the piece of cloth through between rollers, by which process an article is produced, consisting of a piece of cloth with one side coated with rubber; but this is neither our process, nor does it or can it produce the article which we produce or want.

To enable others skilled in the art to make and use our invention, we will proceed to describe it.

We require no new machine, but employ, in new relations to the materials to be acted upon, the four cylinder calender in common use for coating cloth with rubber.

The cylinders and rollers and their position are shown in the drawing hereto annexed.

On the front and back rollers we wind cloth A, and B. The machine being put in motion we introduce the india rubber compound at G between cylinders 1, and 2. This compound is not vulcanized, but in a platic state. This compound passes between the said cylinders 1 and 2, and adhering to cylinder 2, is carried around and down until it comes nearly in contact with cylinder 3, when the end of the roll of cylinder A, is inserted between cylinders 2 and 3, whereupon the rubber compound upon cylinder 2, comes in contact with cloth A, and the two are carried forward between cylinders 2 and 3 and the compound is pressed upon and into the cloth by the action of the cylinders. When the cloth and compound thus united on one side have passed around cylinder 3, until they have come nearly in contact with cylinder 4, the end of the cloth from roller B is inserted between cylinders 3 and 4, so as to come in contact with the compound on cloth A, when the two pieces of cloth with the compound between them passes between the cylinders 3 and 4, and by the combined action of the heat and pressure of the cylinders the rubber compound becomes firmly united with the two pieces of cloth. This fabric is then vulcanized in any known way, whereupon it becomes elastic and ready for use.

The process which we have described and for which we ask Letters Patent we shall employ chiefly in making elastic goods, although it may be employed to great advantage in making any kinds of rubber goods where a considerable body of rubber is required between two pieces of cloth.

The goods made by the above process will of course have more or less elasticity according to and dependent upon the kind and condition of the cloth to which the rubber is applied; for instance, if much elasticity be required, then before or simultaneously with the application of the rubber the cloth may be stretched by any known means and in any known manner and the fabric, after completed, may be cut for use in any direction which will secure the greatest amount of elasticity, or cloth may be used without previous stretching, in which case if cut diagonally for use after completed it will contain a greater or less amount of elasticity according to the size of the meshes formed by the threads of cloth before the application of the rubber, and when the cloth to be used is woven very open; that is, with the meshes large which are formed by the threads, the elasticity of the fabric made of it, by our process will be sufficient for most purposes. But as it is not for the means or manner of stretching the cloth, or for the kind of cloth to be used for which we now seek a patent, but only for a process of applying and combining the rubber compound between two pieces of cloth of any known kind and in any known condition, it is deemed neither necessary nor proper to go into a detailed description of all the various known modes of stretching the cloth or of the various kinds of cloth which may be used, or of how it shall be cut for use after made.

Having now fully described our invention, what we claim and desire to secure by Letters Patent, is—

The process above described of making elastic fabrics without a previous preparation of threads, strips or sheets or the coating of the cloth by cement.

HENRY G. TYER.
JOHN HELM.

Witnesses:
  I. H. VOORHEES,
  ELIAS I. THOMPSON.